INVENTOR
CLAUDE FOURÉ
LUCIEN REINGOLD
BY
ATTORNEYS

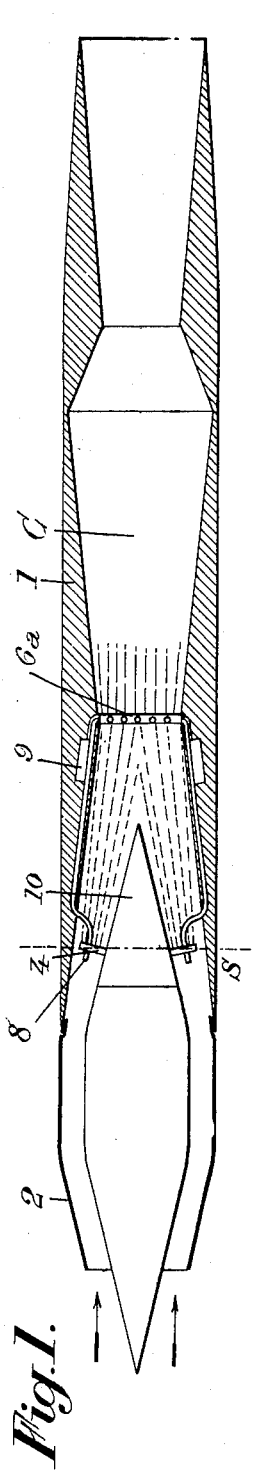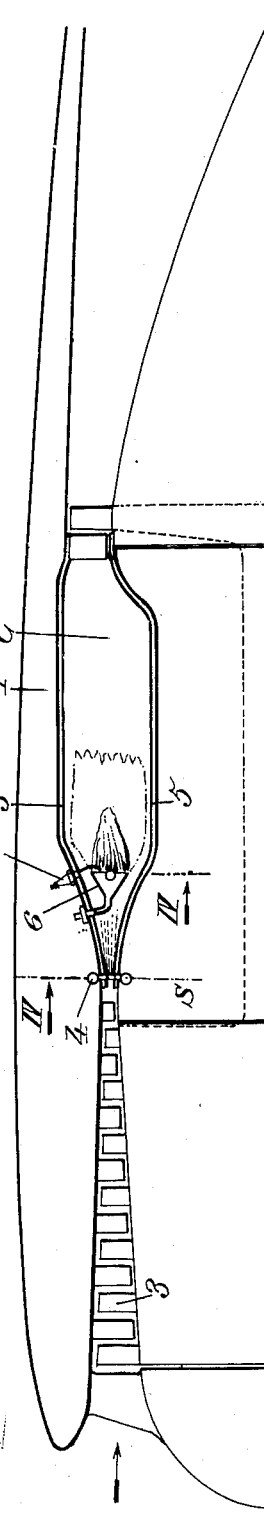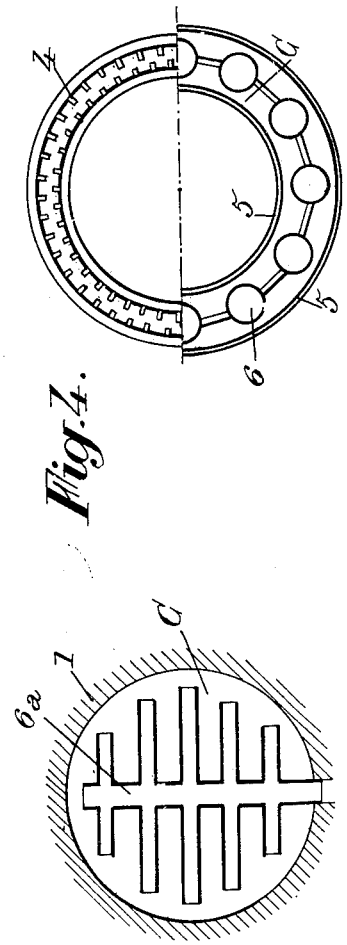

Fig. 8.

United States Patent Office 2,729,059
Patented Jan. 3, 1956

2,729,059

CONTINUOUS FLOW INTERNAL COMBUSTION ENGINES, IN PARTICULAR AIRCRAFT ENGINES

Claude Fouré, Becon-Courbevoie, and Lucien Reingold, Paris, France, assignors to Office National d'Etudes et de Recherches Aeronautiques (O. N. E. R. A.), Paris, France, a French society Application May 29, 1950, Serial No. 164,934

Claims priority, application France May 28, 1949

8 Claims. (Cl. 60—35.6)

The present invention relates to continuous flow internal combustion engines, this term including, in what follows, all thermal machines or plants having one or several combustion chambers through which a continuous or quasi-continuous stream of fuel passes, and it is more particularly concerned with aircraft engines, in which there is a continuous flow (turbo-jets, ram-jets, turbo-props) or a quasi-continuous one (impulse duct engines).

Its chief object is to provide engines of this kind which are better adapted to meet the requirements of practice than those known up to the present time.

Preferred embodiments of the present invention will be hereinafter described with reference to the accompanying drawings, given merely by way of example and in which:

Fig. 1 shows, in diagrammatic axial section, an aircraft ram-jet according to our invention;

Fig. 2 shows, on a larger scale, a particular embodiment of a stabilizing element included in said ram-jet;

Fig. 3 is an axial half-section of a turbo-jet according to our invention;

Figure 5:
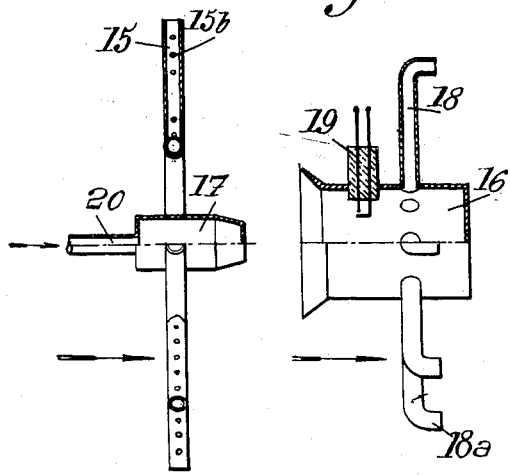
Figure 6:
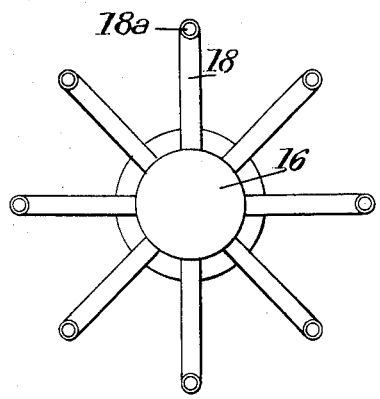
Figure 7:
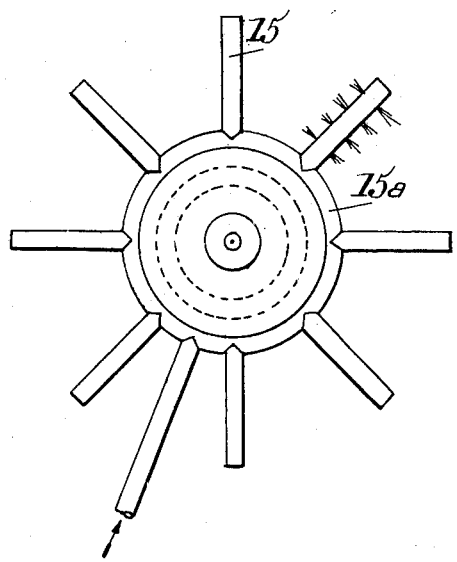

Fig. 4 includes two half-sections on the broken line IV—IV of Fig. 3;

Fig. 5 diagrammatically shows, in side view with portions in axial section, an after-burner system for a turbo-jet according to our invention the elements of this system being shown apart from each other;

Figs. 6 and 7 are end views of two elements of the system illustrated by Fig. 5;

Figure 8:
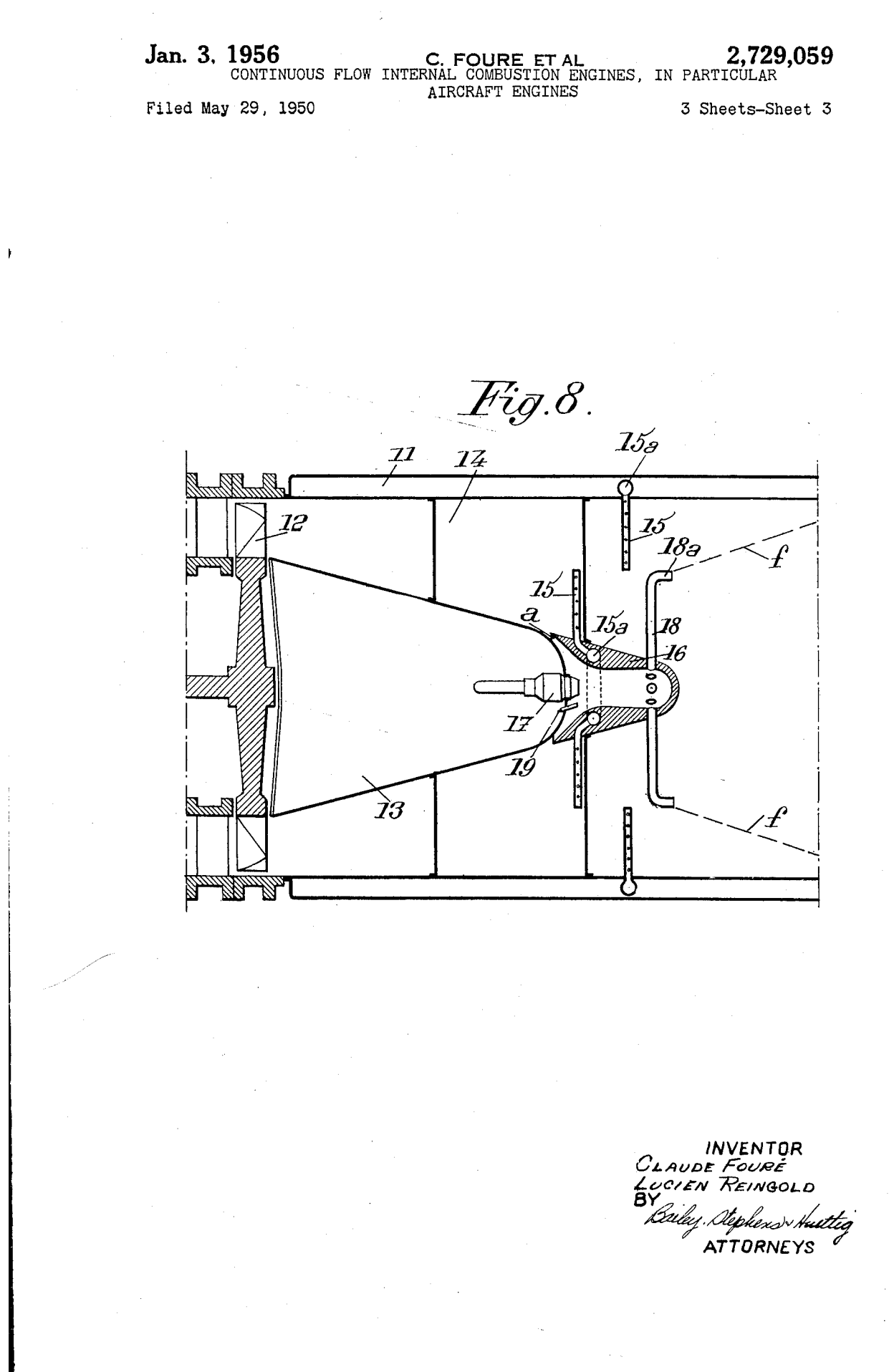

Fig. 8 shows, in axial section, the rear portion of a turbo-jet provided with an after-burner system made according to a particular embodiment of our invention.

According to our invention, the engine as a whole may be of conventional structure, i. e. it includes a compression device the output of which is connected with at least one combustion chamber C formed in a cowling 1, generally of circular shape and the end of which forms a jet nozzle.

In the case, for instance, of a subsonic internal flow ram-jet, the compression device may be constituted by a divergent nozzle 2 (Fig. 1), whereas in the case of a turbo-jet, said device advantageously consists of a compressor 3, for instance of the axial type.

Means are provided for injecting, upstream of combustion zone C, fuel into the air stream which flows through the engine, which means are advantageously constituted in the form of a plurality of injectors 4 distributed along a circumference in a cross section plane S.

According to a feature of our invention the velocity with which the air stream flows through plane S is at least equal to 80 metres per second, for instance equal to 150 metres per second, which can be obtained, for instance, by a suitable choice of the characteristics of the compressor devices (divergent nozzle 2 in the case of a ram-jet and axial compressor 3 in the case of a turbo-jet).

Furthermore, the fuel injection pressure is given a relatively low value ranging from 1.1 to 10 times, and preferably from 1.1 to 5 times, the value of the pressure of the stream flowing through said section, this injection taking place at right angles to the direction of flow and in substantially the whole of the air stream flowing through the engine.

It will be readily understood that this feature has the double advantage of eliminating the difficulties inherent in high pressure injection and avoiding an excessive slowing down, upstream of the injection zone, of the air stream flowing through the engine.

By way of example, if the air pressure in plane S is equal to 1.5 atmosphere, the injection pressure, or to be more accurate, overpressure, may be about 0.3 kg.

According to another feature of our invention, the fuel mixture is ignited by means of a flame holder device disposed in a cross-section plane of the engine where the mixture has been given a velocity ranging from 50 to 200 metres per second, this device maintaining combustion where, in the absence of such a device, combustion would be blown out.

Thus, the flame holder device may directly ensure ignition of practically the whole of the main stream flowing at high velocity.

This arrangement is particularly well adapted to the use of a combustion chamber C of circular section (case of Fig. 1) or annular section (case of Fig. 3), the flame holder devices being arranged, in both cases, to create a multiplicity of incipient ignition zones as regularly distributed as possible on the path of travel of the main stream.

On the other hand, we may, as shown by Fig. 3 concerning the annular combustion chamber of the turbo-jet, bleed off a small portion of the air stream flowing out from compressor 3 toward cooling jackets 5 which surround combustion chamber C.

Preferably, according to our invention, the flame holder device above referred to is constituted by at least one element disposed in the stream in such manner as both to form a flame stabilizing wake and to ignite the mixture either by emitting a bare and continuous or intermittent flame, or by being heated for the necessary time, preferably by an auxiliary internal combustion, to a temperature sufficient for igniting the mixture.

A bare flame device may be constituted, as shown by Figs. 3 and 4, by a plurality of pilot burners 6 distributed along a circumference in the intake zone of combustion chamber C, at least one of said burners including ignition means constituted, for instance, by a spark plug 7.

In this case, the flow rate of the fuel injected in the pilot burners may be substantially constant, the variations of the fuel total output being then produced chiefly through injectors 4. When these injectors are out of service, it is still possible to obtain an economical operation of the engine by means of the only fuel supplied through pilot burners 6.

As already above stated, the pilot flame of burner devices 6 may be intermittent and, in particular be supplied with fuel only during the starting period of the engine.

Anyway, burner devices 6 give rise, by their presence in the stream at relatively high speed, to a wake the effect of which is to stabilize the flame which is formed in the whole of said stream at the level of said burner devices.

If we make use of a flame holder device of the internal auxiliary combustion type, such a device may be constituted, as shown by Fig. 1 in the case of the ram-jet, by a kind of hollow grid or grate 6a, supplied from air intakes 8 opening preferably into the main stream on the upstream side of section S.

It will be of interest in this case to make use (same as in the case of a bare pilot flame), of hypergol fuels (contained in special tanks 9 distinct from the main tank 10), or even of an explosive, the duration of the combustion being practically limited to some seconds. Once the inflammable main flux is ignited, the combustion is maintained by itself, the external walls of grid 6a remaining at a high temperature and said grid, which is no longer being supplied with fuel, then having solely the stabilizing function of the conventional grids.

We have shown by way of example, on Fig. 2, a particularly advantageous embodiment of such a grid, the fuel and air mixture flowing into a central stem and being distributed to branches at the ends of which it flows out, after combustion, in the form of burnt gas which mixes with the main stream.

It should be noted that ignition, in grid 6a, may, in particular in the case of quick combustion, be obtained by means of catalytic bodies.

Of course, the compressor might be of the centrifugal type, in which case the main injection would advantageously be performed in the diffuser itself of said compressor.

We will now proceed to describe our invention as applied to an after-burner system intended to supply supplementary energy on the downstream side of the turbine of a turbo-jet unit.

This engine, with the exception of its after-burner system, may be of any suitable construction. For instance, as diagrammatically shown by Fig. 8, it includes, in a main casing 11 provided at the rear with an exhaust nozzle (not shown) a turbine 12 (for driving the compressor) immediately behind which is provided an axial tail cone 13 advantageously supported by radial arms 14.

Concerning now the after-burner system, it includes the following parts: at least one fuel injection device, located behind the turbine and before the exhaust nozzle, this device being advantageously constituted by a plurality of radial arms 15 (see Figs. 5 and 7) supplied with fuel through an annular manifold 15a, the ejection of fuel taking place preferably through suitably located orifices 15b in directions perpendicular to the flow of the main stream; and a flame holder device intended to achieve ignition and flame stabilization of the fuel mixture formed by injection radial arms 15.

This flame holder device is constituted, as shown by Figs 5 and 6, by a central combustion chamber 16 mounted substantially in the axis of the engine (on the downstream side of injection radial arms 15) and at least temporarily supplied with fuel through an auxiliary axial injector 17 disposed upstream of said chamber, which is fitted with hollow radial arms 18, possibly inclined in the direction of flow, intended to evacuate the combustion products so as to ignite the fuel mixture supplied by injection radial arms 15 and to stabilize the resulting flame.

The radial arms 18 of the flame holder are preferably given a diameter smaller than that of the radial arms 15 of the injection device, said arms 18 being advantageously bent at their ends 18a in the direction of flow of the main stream.

Anyway, the number of radial arms 18 is the same as that of radial arms 15, and they are similarly disposed so as to comply with the general requirement that the points of ignition are located along the paths of the streamlines passing through the points of fuel injection.

Ignition of the mixture formed in combustion chamber 16 may be achieved, for instance, by means of a spark plug 19, or through any other suitable means.

The feed of fuel to chamber 16, which takes place through axial injector 17, is independent of that of fuel to injection radial arms 15 but may be ensured, through an axial conduit 20, with the same fuel which is used for the general feed of the turbo-jet.

As for the distance to be provided between injection radial arms 15 and the plane of the outlet sections of radial arms 18, it is to be adjusted experimentally for every particular type of turbo-jet, but it may be stated that, as a rule, it will average some ten centimeters.

It should be noted here that the feed of fuel to injector 17 will take place, as a rule, only during the post-combustion device starting period. Once the secondary flame is ignited and stabilized, tubes 18, which form a true radiating grid, will in fact stabilize said flame which will keep them at a temperature capable of maintaining the inflammation of the fuel mixture. By way of example, and merely to give a range of dimensions, injector 17 may be fed for a time of some seconds.

Thus, in the stream issuing from turbine 12, afterburning takes place in particularly favorable conditions, in view of the speeds at which the main stream is flowing in this portion of the turbo-jet.

This speed may, in some cases, be as high as 250 metres per second, which gives its full value to the low aerodynamic drag of the axial combustion chamber 16 fitted with its radial arms 18.

Of course the above described flame holder device might possibly be completed by elements intended to increase the stabilizing wake of the radiating grid, which elements may be constituted, for instance, by portions of circular arc-shaped tubes located in the intervals between two consecutive radial arms 18.

Having described in what precedes the essential elements of an after-burner system made according to our invention, we will now indicate, by way of example illustrated by Fig. 8, how said elements can be disposed and grouped in a particularly advantageous fashion in the case of a turbo-jet fitted with a tail cone 13.

According to the embodiment shown by said Fig. 8, injector 17 and device 19 are housed inside tail cone 13 and at the rear end thereof.

Combustion chamber 16 is given a conical outer shape forming an extension, from an aerodynamic point of view, of tail cone 13, care being however taken to leave between these two elements an annular passage *a* for the inflow into said chamber 16 of the air bled off from the main stream.

The injection device is constituted by at least two sets of radial arms 15 carried respectively by combustion chamber 16 and envelope 11, these two sets of radial arms being preferably located at a distance from each other in the axial direction (the external set rearwardly of the internal one) and covering, in combination, practically the whole of the main stream free section of flow, whereby a homogeneous distribution and stratification of the fuel throughout substantially the whole of the main stream are obtained.

We locate respectively in chamber 16 and in envelope 11, the two manifolds 15a of the two sets of injectors 15, whereby the manifolds in question produce no supplementary drag.

It is of interest to note that, despite the fact that the diameter of the radiating grid 18 is substantially smaller than the inner diameter of envelope 11, owing to the flame stabilization of the fuel injected through the internal set of injectors 15 (flame of conical general shape as diagrammatically shown by dotted lines *f*), the flame corresponding to the fuel injected through the external set of injectors 15 is automatically stabilized.

This results from the fact that the fuel mixture formed in line with this last mentioned series of injectors, although it does not strike radiating grid 18, is ignited and stabilized when it reaches the stabilized flame cone *f*.

However, it seems of interest, when two series of injectors 15 arranged as above described are used, to give the internal set substantially the same diameter as the radiating grid, and even a smaller diameter if more than two sets of injectors 15 are used.

Finally, it will be seen that the whole of the afterburner arrangement disposed at the rear of tail cone 13 makes it possible to obtain a secondary flame which occupies the whole of the internal cross section of envelope 11 and this without inducing important supplementary drags.

Similar arrangements might be applied to the secondary flow of a two flow turbo-machine.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A continuous flow internal combustion engine which comprises, in combination, at least one duct for the flow of a gaseous stream, said duct including at least one comburent gas intake, at least one tubular element having its mean line transverse to said duct downstream of said intake to inject fuel through the mass of said comburent gas, said tubular element being provided with a multiplicity of fuel outlets distributed along its length and opening at a substantial distance from the walls of said duct and transversely both to the flow direction in said duct and to said mean line, means for supplying fuel to said tubular element, and flame holder means located in said duct downstream of said fuel injection tubular element.

2. A continuous flow internal combustion engine which comprises, in combination, a structure forming a duct shaped to have a longitudinal axis, said structure including at least one comburent gas intake, a plurality of fuel injection tubular elements in said duct radially disposed with respect to said axis and located downstream of said intake and each carried only at one end thereof to said structure, said tubular elements being each provided in its wall with a multiplicity of fuel outlet orifices distributed along its length and opening at right angles to said duct axis, fuel manifold means for supplying fuel to the ends of said tubular elements where they are secured to said structure, and flame holder means carried by said structure and located in said duct downstream of said fuel injection tubular elements.

3. In a continuous flow internal combustion engine including a duct for the flow of a gaseous stream provided with an air intake and means for injecting fuel into said duct to form a stream of a fuel and comburent gas mixture, a flame holder device which comprises, in combination, means, including a hollow member located in said duct and having an axis of symmetry parallel to the direction of flow through said duct, for distributing combustion gases to a region of said duct downstream of said fuel injecting means, a fuel injector opening into said member coaxially therewith, means for feeding fuel to said injector independently of the feed of said fuel injecting means, means for feeding comburent gas to the outlet of said injector, and means for igniting the fuel issuing from said injector, whereby combustion gases are formed downstream of said injector to supply said distributing means.

4. In a continuous flow internal combustion engine including a duct for the flow of a gaseous stream provided with a comburent gas intake and means for injecting fuel into said duct to form a stream of a fuel and comburent gas mixture, a flame holder device which comprises, in combination, a fuel combustion chamber located centrally in said duct, means for feeding comburent gas to said chamber, means for feeding fuel to said chamber independently of the feed of said fuel injecting means, means for igniting fuel in said chamber, rods located downstream of said fuel injecting means, carried only by said chamber on the outside thereof and extending radially therefrom transversely to said duct, and means for leading gases from said combustion chamber to regions of said duct located in the wakes of said rods and close thereto.

5. An engine according to claim 2 in which said duct structure is annular over at least a portion of its length and includes a peripheral portion and a central portion coaxial therewith, said fuel injection tubular elements being grouped in at least two sets located each in a cross section plane of the duct structure, one of these sets being carried by the central portion of the duct structure and extending only to a distance from said peripheral portion, and the other one, located downstream of the first one, being carried by the peripheral portion of the duct structure and extending only to a distance from said central portion.

6. A turbo-jet engine which comprises, in combination, a turbine, an exhaust cylindrical duct mounted behind said turbine, a tail cone coaxially mounted in said duct behind the central portion of said turbine, a plurality of fuel injection tubular elements in the annular space between said cone and said duct disposed radially with respect to the axis of said duct, said tubular elements being each provided in its wall with a multiplicity of fuel outlet orifices opening transversely to said axis, fuel manifold means for supplying fuel to said tubular elements, a fuel combustion chamber carried by said cone at the rear end thereof, means for feeding comburent gas to said chamber, means for feeding fuel to said chamber independently of the feed of fuel to said fuel injection tubular elements, means for igniting fuel in said chamber, rods carried by said chamber on the outside thereof extending radially therefrom transversely to said duct downstream of said fuel injection tubular elements and located along the streamlines of the gaseous flow which pass along said tubular elements respectively, and means for leading gases from said combustion chamber to regions of said ducts located in the wakes of said rods and close thereto.

7. An engine according to claim 2 in which the flame holder means are formed by rods radially disposed with respect to said axis, each rod being carried only at one end by said structure and being located in the wake of the corresponding tubular injection element.

8. An engine according to claim 4 further comprising means for bleeding off comburent gas from said duct and leading it to said combustion chamber, said rods having a hollow structure and communicating at their inner ends with said chamber and opening at their outer ends rearwardly into said duct, whereby they further constitute the last mentioned means of claim 4.

References Cited in the file of this patent

UNITED STATES PATENTS

| | | |
|---|---|---|
| 2,482,505 | Pierce | Sept. 20, 1949 |
| 2,508,420 | Redding | May 23, 1950 |
| 2,520,388 | Earl | Aug. 29, 1950 |
| 2,529,506 | Lloyd et al. | Nov. 14, 1950 |
| 2,563,270 | Price | Aug. 7, 1951 |
| 2,572,723 | Hildestad | Oct. 23, 1951 |
| 2,625,788 | Neikirk et al. | Jan. 20, 1953 |
| 2,640,321 | Pouchot | June 2, 1953 |